(12) United States Patent
Alston et al.

(10) Patent No.: US 9,197,069 B2
(45) Date of Patent: Nov. 24, 2015

(54) POWER TRANSMISSION SYSTEMS

(71) Applicant: GE Energy Power Conversion Technology Ltd, Rugby Warwickshire (GB)

(72) Inventors: David Leonard Alston, Rugby (GB); Dominic David Banham-Hall, Northampton (GB)

(73) Assignee: GE ENERGY POWER CONVERSION TECHNOLOGY LTD. (GB)

( * ) Notice: Subject to any disclaimer, the term of this patent is extended or adjusted under 35 U.S.C. 154(b) by 265 days.

(21) Appl. No.: 14/038,983

(22) Filed: Sep. 27, 2013

(65) Prior Publication Data
US 2014/0092650 A1 Apr. 3, 2014

(30) Foreign Application Priority Data

Sep. 28, 2012 (EP) .................... 12186514

(51) Int. Cl.
| | |
|---|---|
| H02J 3/36 | (2006.01) |
| H02J 3/38 | (2006.01) |
| H02M 7/02 | (2006.01) |
| H02M 7/757 | (2006.01) |
| H02M 1/00 | (2007.01) |

(52) U.S. Cl.
CPC . *H02J 3/36* (2013.01); *H02J 3/386* (2013.01); *H02M 7/02* (2013.01); *H02M 7/7575* (2013.01); *H02M 2001/0077* (2013.01); *Y02E 10/763* (2013.01); *Y02E 60/60* (2013.01)

(58) Field of Classification Search
CPC ............ H02J 3/36; H02J 3/386; H02M 7/02; H02M 7/7575
See application file for complete search history.

(56) References Cited

U.S. PATENT DOCUMENTS

| | | | |
|---|---|---|---|
| 8,345,457 B2 * | 1/2013 | Asplund et al. | ............... 363/132 |
| 8,476,854 B2 * | 7/2013 | Blocher et al. | ............. 318/400.3 |

(Continued)

FOREIGN PATENT DOCUMENTS

| | | |
|---|---|---|
| WO | 0152379 A2 | 7/2001 |
| WO | 2009110648 A1 | 9/2009 |

OTHER PUBLICATIONS

Y Etienne Veilleux et al: "Interconnection of direct-drive wind turbines using a distributed HVDC converter station", IECON 2009—35th Annual Conference of IEEE Industrial Electronics (IECON 2009)—Nov. 3-5, 2009—Porto, Portugal, IEEE, Piscataway, NJ, USA, (Nov. 3, 2009), pp. 584-589, XP031629636, ISBN: 978-1-4244-4648-3.

(Continued)

*Primary Examiner* — Emily P Pham
(74) *Attorney, Agent, or Firm* — GE Global Patent Operation; Catherine J. Toppin

(57) ABSTRACT

An offshore wind farm includes a plurality of wind turbines connected to an onshore converter station by means of a distributed power transmission system. The power transmission system includes a series of offshore converter platforms distributed within the wind farm. Each converter platform includes a busbar carrying an ac voltage for the converter platform and to which the wind turbines are connected. Each converter platform also includes one or more converter transformers connected to the busbar and a series of one or more converter modules. The power transmission system includes dc transmission lines which deliver generated power back to the onshore converter station.

13 Claims, 5 Drawing Sheets

(56) References Cited

U.S. PATENT DOCUMENTS

| | | | |
|---|---|---|---|
| 9,048,694 B2* | 6/2015 | Pan et al. ............................ | 1/1 |
| 2010/0156189 A1 | 6/2010 | Fishman | |
| 2012/0175962 A1* | 7/2012 | Zhan et al. ..................... | 307/82 |
| 2013/0193766 A1* | 8/2013 | Irwin et al. ..................... | 307/82 |

OTHER PUBLICATIONS

Frank Schettler et al, "Roadmap to the Supergrid Technologies" (Jan. 3, 2012), XP055050565, Retrieved from the Internet: URL:http://www.cesi.itj news ideas j ideasjDocuments/FOSG WG2 Final-report.pdf.

Bahrman, "HVDC Transmission Overview", Transmission and Distribution Conference and Exposition, 2008. T&D. IEEE/PES, IEEE, Piscataway, NJ, US, Apr. 21, 2008, pp. 1-7.

Koldby, "Challanges on the road to an Offshore HVDC grid", Nordic Wind Power Conference, Nov. 9, 2009.

European Search Report from corresponding European Application No. 12186514, dated Mar. 5, 2013.

\* cited by examiner

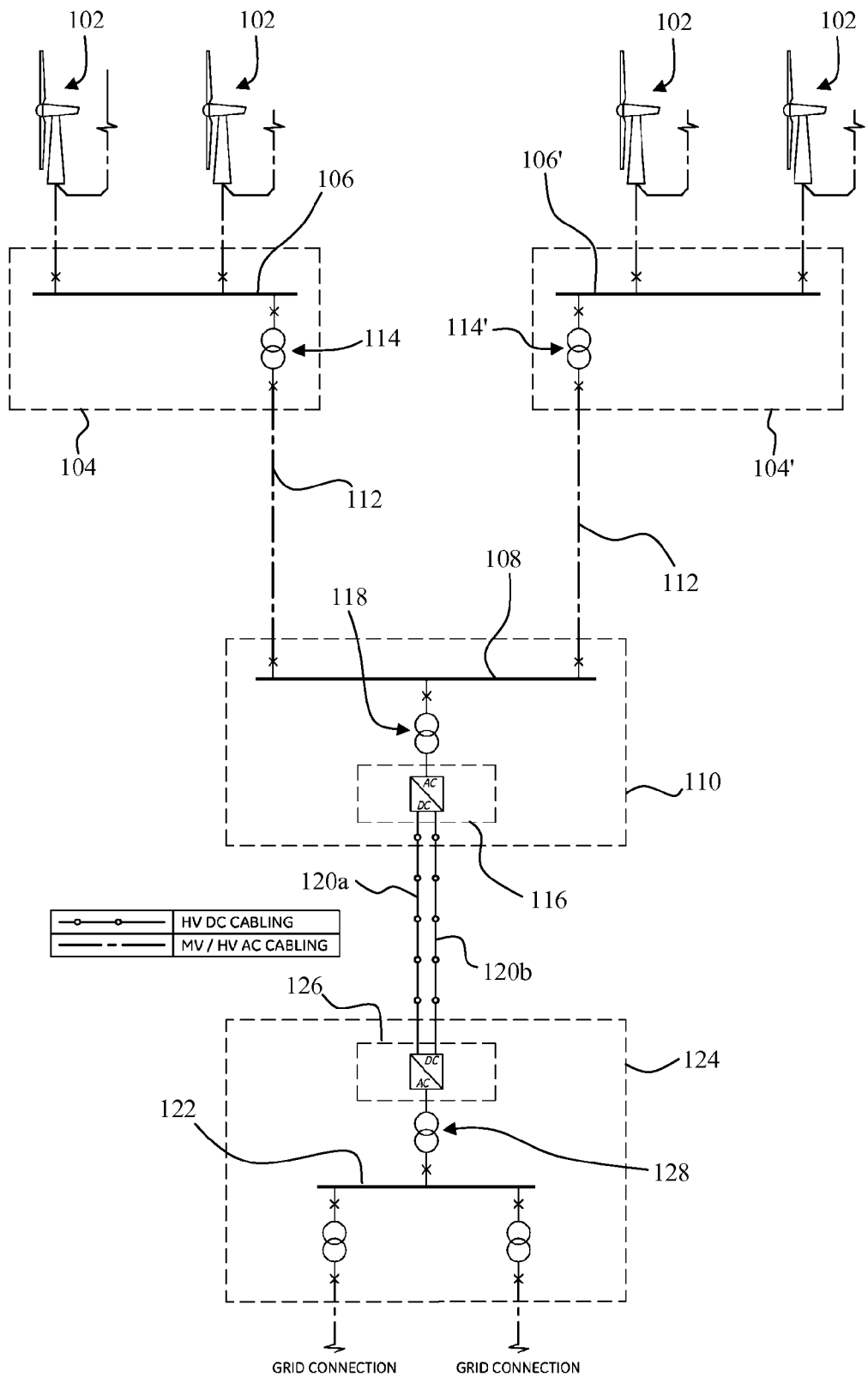
Figure 1 – PRIOR ART

US 9,197,069 B2

POWER TRANSMISSION SYSTEMS

TECHNICAL FIELD

The invention relates to power transmission systems, and in particular to a distributed, modular and cost-effective power transmission system which can be used with energy generating devices such as wind turbines, for example.

BACKGROUND ART

It is possible to convert wind energy to electrical energy by using a wind turbine to drive the rotor of a generator. A plurality of wind turbines can be connected together in clusters to form a wind farm.

There is a growing tendency for wind farms to be located offshore because of environmental issues and concerns. In this situation, the power generated by the wind turbines must be transmitted to shore and this is typically achieved using subsea cables. Such subsea cables can make use of high-voltage direct current (HVDC) power transmission.

In a conventional point to point power transmission system of the type shown in FIG. 1, wind turbine clusters 102 are connected to offshore collector platforms 104 and 104'. Each collector platform 104, 104' includes a busbar 106, 106' that is connected to the busbar 108 of a separate offshore converter platform 110. The connection between the busbars 106, 106' of the collector platforms and the busbar 108 of the converter platform 110 is by means of medium voltage (MV) or high voltage (HV) ac cabling 112 and step-up transformers 114, 114' which are provided on the offshore collector platforms.

The offshore converter platform 110 includes an AC/DC converter 116 having ac terminals that are connected to the busbar 108 by means of a converter transformer 118 and dc terminals that are connected to the upstream ends of first and second dc transmission lines 120a, 120b implemented as HV dc cabling. The downstream ends of the first and second dc transmission lines 120a, 120b are connected to the busbar 122 of an onshore converter station 124 by means of a DC/DC converter 126. In particular, the dc terminals of the DC/DC converter 126 are connected to the first and second dc transmission lines 120a, 120b and the ac terminals of the DC/DC converter are connected to the busbar 122 by means of a converter transformer 128. The busbar 122 is then connected to a utility grid.

SUMMARY OF THE INVENTION

The present invention provides a power transmission system comprising a series of two or more converter platforms distributed within an area, each converter platform including: (i) a busbar carrying an ac voltage for the converter platform and connectable to one or more devices, (ii) one or more converter transformers connected to the busbar, and (iii) a series of one or more converter modules, each converter module comprising (a) ac terminals connected to a respective one of the converter transformers, and (b) first and second dc terminals; wherein for the first converter platform in the series the first dc terminal of the first converter module in the series is connected to a first dc transmission line; wherein for each converter platform apart from the last converter platform in the series the second dc terminal of the last converter module in the series is connected to the first dc terminal of the first converter module in the series of the next converter platform in the series by means of a dc connection line; and wherein for the last converter platform in the series the second dc terminal of the last converter module in the series is connected to a second dc transmission line.

In practice the power transmission system can have n converter platforms, where n≥2 and is selected with regard to the overall system design and transmission requirements. In its most basic arrangement, the power transmission system can comprise a first converter platform and a second converter platform (i.e. n=2). The first converter platform will be the first converter platform in the series and the second converter platform will be the last converter platform in the series.

Each converter platform can include a single converter transformer connected to the busbar and a single converter module having its ac terminals connected to the converter transformer. The single converter module will be the first and last converter module in the series. Alternatively, each converter platform can include two or more converter transformers and a series of two or more converter modules. The converter modules are preferably connected together with the second dc terminal of each converter module apart from the last converter module in the series being connected to the first dc terminal of the next converter module in the series. For example, if three converter modules are provided on a particular converter platform then the first dc terminal of the first converter module in the series is connected to the first dc transmission line or a dc connection line as appropriate, the second dc terminal of the first converter module is connected to the first dc terminal of the second converter module, and the second dc terminal of the second converter module is connected to the first dc terminal of the third converter module. It will be readily appreciated that if the converter platform is the first converter platform in the series then the first dc terminal of the first converter module will be connected to the first dc transmission line. However, if the converter platform is an intermediate converter platform then the connection will be to a dc connection line. The second dc terminal of the third converter module, being the last converter module in the series, is connected to the second dc transmission line or a dc connection line as appropriate. It will be readily appreciated that if the converter platform is the last converter platform in the series then the connection will be to the second dc transmission line. However, if the converter platform is an intermediate converter platform then the connection will be to a dc connection line. Adjacent converter platforms in the series are therefore connected together by a dc connection line.

In the basic arrangement where n=2 then for the first converter platform the first dc terminal of the first converter module in the series is connected to the first dc transmission line and the second dc terminal of the last converter module in the series is connected to the first dc terminal of the first converter module in the series for the second converter platform by means of a dc connection line. In an alternative arrangement where n=3 then the power transmission system will include a first converter platform, a second converter platform, and a third converter platform. The first converter platform will be the first converter platform in the series, the second converter platform will be an intermediate converter platform, and the third converter platform will be the last converter platform in the series. For the first converter platform the first dc terminal of the first converter module in the series is connected to the first dc transmission line and the second dc terminal of the last converter module in the series is connected to the first dc terminal of the first converter module in the series for the second converter platform by means of a first dc connection line. For the second converter platform the second dc terminal of the last converter module in the series is connected to the first dc terminal of the first converter module in the series for the third converter platform by means of a second dc connection line. For the third converter platform then the second dc terminal of the last converter module in the series is connected to the second dc transmission line.

It will be readily appreciated that further converter platforms can be connected together in a similar manner.

The devices that are connected to the busbars of the converter platforms in use can be energy generating devices such as wind turbines, subsea turbines, and other renewal energy devices that extract energy from waves or tidal flows. In this case, the direction of power flow is typically from the energy generating devices to the dc transmission lines, but power may be supplied to the energy generating devices in certain circumstances. The devices can also be energy consuming devices or loads. In this case, the direction of power flow is from the dc transmission lines to the energy consuming devices or loads. A practical example would be a power transmission system that supplies power to converter platforms forming part of an oil and gas production platform or a liquefied natural gas (LNG) production platform where the loads might include different types of plant machinery and equipment. The power transmission system can also be used as a reliable auxiliary power source for energy generating devices that are being commissioned or installed. A different number and/or type of device can be connected to the busbar of each converter platform.

The power transmission system can be a monopole or bipole arrangement as required. Any convenient ac voltage levels (as carried by the converter platform busbars) and any convenient dc voltage levels and polarity can be employed throughout the power transmission system. The following values are provided by way of example only and should not be considered to be limiting.

The ac connection lines (or in-field cabling) that connect the devices to the busbar of each converter platform can operate at between 33 kV and 77 kV depending upon proposed capacity and interconnection string length. The dc transmission lines and dc connection lines can operate at a dc transmission voltage of up to about 320 kV depending upon proposed transmission capacity requirements. The ac connection lines that optionally connect together the busbars (see below) can operate at an ac interlinking voltage that is largely determined by separation distance and platform capacity. Generally an interlinking capacity of about 30% to 40% of installed capacity is considered to be adequate for most applications. The power transmission system can provide capacities of up to about 500 MW per converter platform.

The flexibility of the power transmission system means that that only one of the converter platforms and part of the converter station needs to be completed before power can be delivered to (or from) the utility grid. Using two or more separate converter platforms provides a degree of gradual degradation and redundancy, and allows the power transmission system to be extended during separate phases of development. Infrastructure for the power transmission system in the form of cabling etc. could be installed in advance to allow additional converter platforms to be easily installed at a later date.

The converter platforms may be physically separated by up to several kilometers. At least one of the converter platforms can be located offshore and the converter station (see below) can be located onshore.

The power transmission system is preferably 'modularised' (i.e. comprises modular or standardised units) to allow for ease of construction and installation. Because the power transmission system is a 'distributed' system (i.e. converter function is distributed across two or more converter platforms depending on power transmission requirements) the converter platforms can be positioned relatively close to the devices or loads. The converter platforms are smaller and lighter than conventional platforms and there is no need to install separate collector platforms typically found in conventional point to point power transmission systems. This is particularly important for power transmission systems for offshore converter platforms where the converter equipment and construction materials for the actual platforms need to be transported on marine vessels. Although the power transmission system preferably utilises modular or standard units, it will be readily appreciated that respective converter platforms can have a different number of converter transformers, converter modules etc. Converter modules within a particular converter platform can also have a different number of AC/DC converter units. The modularised design permits the use of converter modules and converter transformers of standard design and configuration. Each converter module can include one or more standard AC/DC converter units as described in more detail below. Standard converter platform installation modules, perhaps comprising the AC/DC converter units that together define a single converter module, together with its associated converter transformer, might be packaged together in a suitable housing or container that can be easily transported and connected to a busbar and to each other when installed on a converter platform.

Each converter module can include a series of one or more AC/DC converter units each AC/DC converter unit having (a) ac terminals connected to the converter transformer, and (b) first and second dc terminals. For each converter module, the first dc terminal of the first AC/DC converter unit in the series can define the first dc terminal of the converter module and the second dc terminal of the last AC/DC converter unit in the series can define the second dc terminal of the converter module. The AC/DC converter units are preferably connected together such that the second dc terminal of each AC/DC converter unit apart from the last AC/DC converter unit in the series is connected to the first dc terminal of the next AC/DC converter unit in the series. In practice, all of the individual AC/DC converter units of each converter platform are preferably connected together in series on the dc-side to form a single interconnected array that extends between dc output terminals of the converter platform. One or more groups of AC/DC converter units corresponding to each converter module are connected to a respective converter transformer on the ac-side.

The AC/DC converter units can have any suitable construction and topology.

The dc terminals of the AC/DC converter units can be connected together by any suitable dc cabling to define each converter module. Similarly the dc terminals of the converter modules can be connected together by any suitable dc cabling.

The dc transmission lines and the dc connection line(s) can be implemented using high voltage (HV) dc cabling of any suitable type and construction, including types that are particularly suitable for subsea use in the case where the converter platforms are located offshore.

The dc transmission lines are preferably connected to a converter station which provides an ac output voltage for connection to a utility grid or power network, for example. The converter station can have any suitable construction and topology. However, it will generally be preferred that the converter station has a similar overall construction to the converter platforms and benefits from the modularisation described above.

The converter platforms can be located several kilometers from the converter station.

It is generally preferred that the converter platform busbars are connected together to form an electrical 'backbone' for the power transmission system. For example, the busbars can be connected together by one or more ac connection lines. The ac connection lines can be implemented using medium voltage (MV) or HV ac cabling of any suitable type and construction, including those for subsea use. The connection to each busbar can be made by means of a connection transformer. For example, in the case where n=2 then an ac connection line can be connected to the busbar of the first converter platform by a first connection transformer and to the busbar of the second converter platform by a second connection transformer. In the case where n=3 then two arrangements are possible. In a first arrangement a first ac connection line can be used to connect the busbar of the first converter platform to the busbar of the second converter platform, and a second ac connection line can be used to connect the busbar of the second converter platform to the busbar of the third converter platform. However, a second arrangement is typically preferred where the electrical 'backbone' is common to all converter platforms, i.e. the busbars are connected together in parallel. In this second arrangement an ac connection line can be connected to the busbar of the first converter platform by a first connection transformer, to the busbar of the second converter platform by a second connection transformer, and to the busbar of the third converter platform by a third connection transformer. The electrical 'backbone' allows power to be shifted or transferred between the converter platform busbars through the ac connection line(s) and net transmitted power is shared across the active converter modules. The interconnection also provides a level of redundancy ensuring that if one converter platform is removed from service then it does not cause a total blackout and the complete disruption of transmission capacity. The supply of auxiliary power to energy consuming devices or loads (or, in certain situations, energy generating devices) is therefore reasonably assured.

Each converter transformer is preferably connected to the busbar by means of a switch or circuit breaker. This can allow each converter transformer (and its associated converter module) to be isolated from the busbar. For example, in the case of a fault in a particular converter module then it can be isolated until such time as it can be repaired. One or more converter modules can also be selectively isolated depending on the overall operating requirements of the power transmission system to reduce switching losses etc.

Each connection transformer can also be connected to the busbar and the ac connection line by means of a switch or circuit breaker.

One or more devices can be connected to the busbar of each converter platform by means of ac in-field cabling and optional switch or circuit breaker.

In one arrangement a wind farm or wind turbine park comprises a power transmission system as described above and a plurality of wind turbines. The converter platforms are distributed within the wind farm and each wind turbine is connected to the busbar of a converter platform, for example where the wind turbines are connected in strings that are connected to the busbar by means of ac in-field cabling and optional switch or circuit breaker.

The present invention further provides a method of operating a power transmission system comprising a series of two or more converter platforms distributed within an area, each converter platform including: (i) a busbar carrying an ac distribution voltage for the converter platform and connectable to one or more devices, (ii) one or more converter transformers connected to the busbar, and (iii) a series of one or more converter modules, each converter module having (a) ac terminals connected to a respective one of the converter transformers, and (b) first and second dc terminals, the busbars being connected together by an ac connection line; the method comprising the step of transferring power through the ac connection line.

Further details of the power transmission system are as described above.

DRAWINGS

FIG. 1 is a schematic diagram showing a conventional point to point power transmission system with a collection platform and a separate converter platform;

Figure 2A:
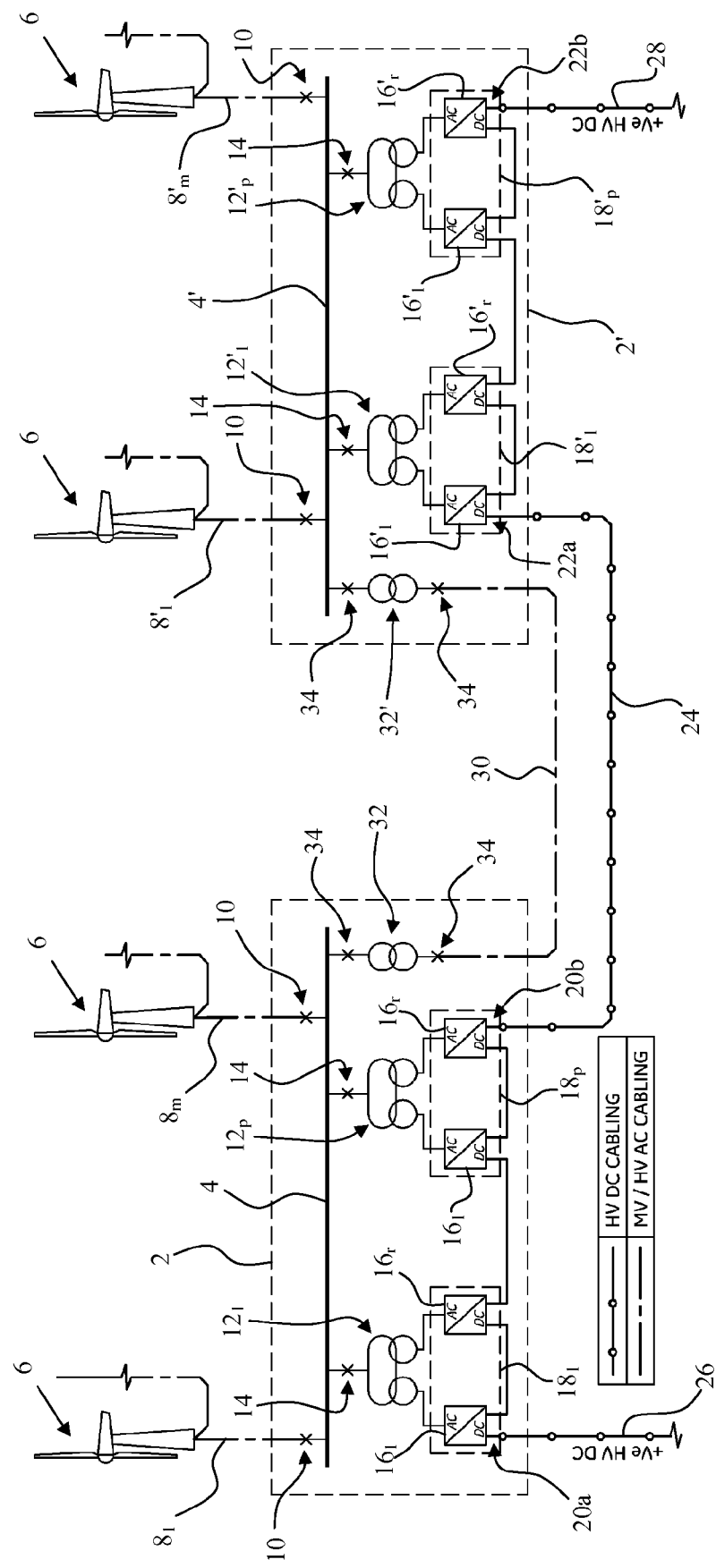
FIGS. 2A and 2B are schematic diagrams showing a power transmission system according to the present invention with two converter platforms.
Figure 2B:
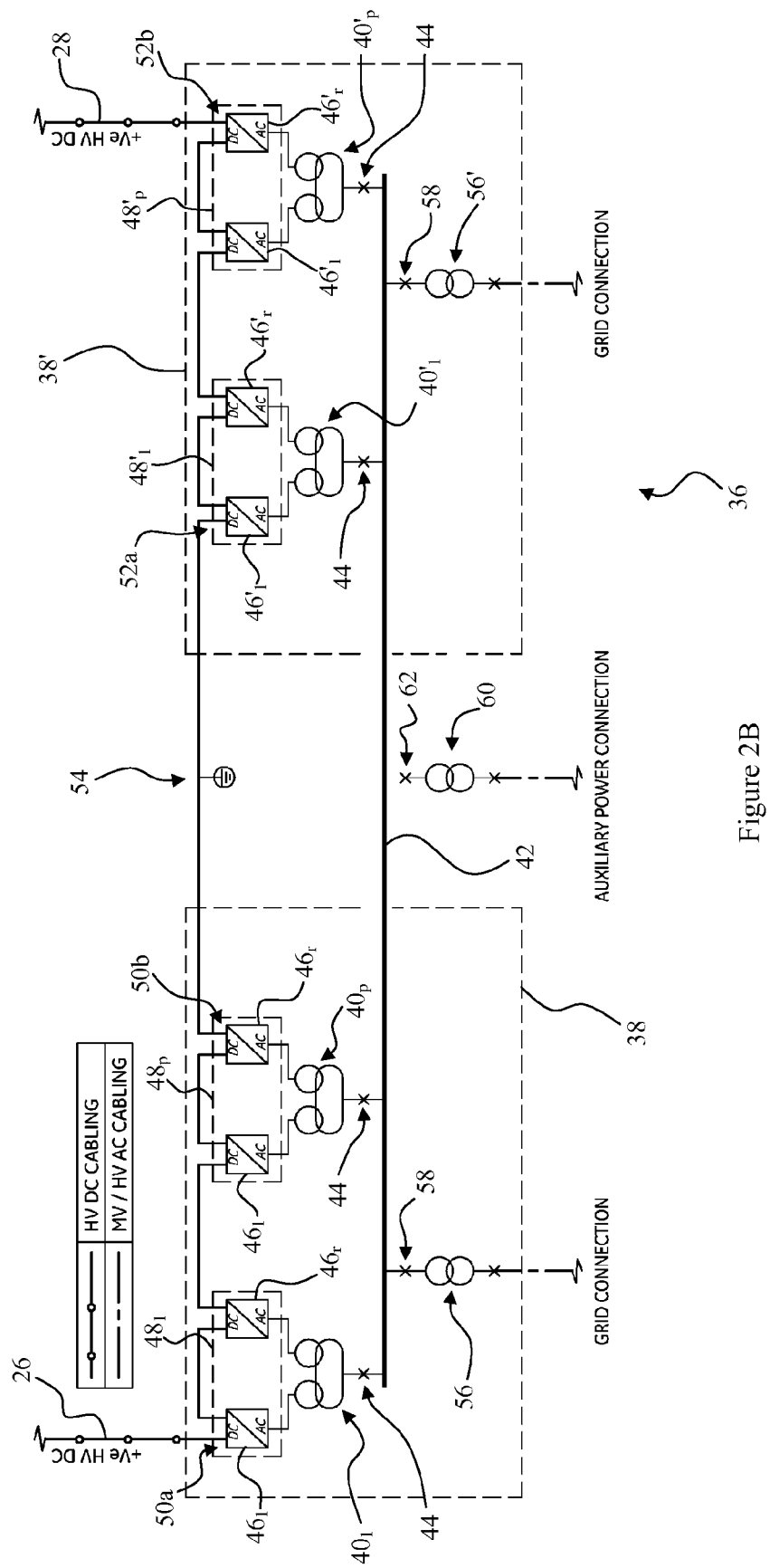

With reference to FIGS. 2A and 2B a power transmission system according to the present invention includes a first offshore converter platform 2 and a second offshore converter platform 2' (i.e. where n=2).

The first converter platform 2 includes a first busbar 4 carrying a convenient ac voltage. The second converter platform 2' includes a second busbar 4' carrying a convenient ac voltage.

Wind turbines 6 forming part of a wind farm or wind turbine park are connected together in strings by medium voltage (MV) or high voltage (HV) in-field ac cabling. A series of strings $8_1 \ldots 8_m$ are connected to the first busbar 4 by circuit breakers 10. A series of strings $8'_1 \ldots 8'_m$ are connected to the second busbar 4' by circuit breakers 10. It will be readily appreciated that in each case m may be any convenient number and that each string may include any convenient number of wind turbines. Although the following description concentrates on a power transmission system for a wind farm, it will be readily appreciated that a similar system could be used to deliver power to energy consuming devices or loads, e.g. those associated with oil and gas production platforms, liquefied natural gas (LNG) production platforms or other onshore or offshore installations.

Figure 3:
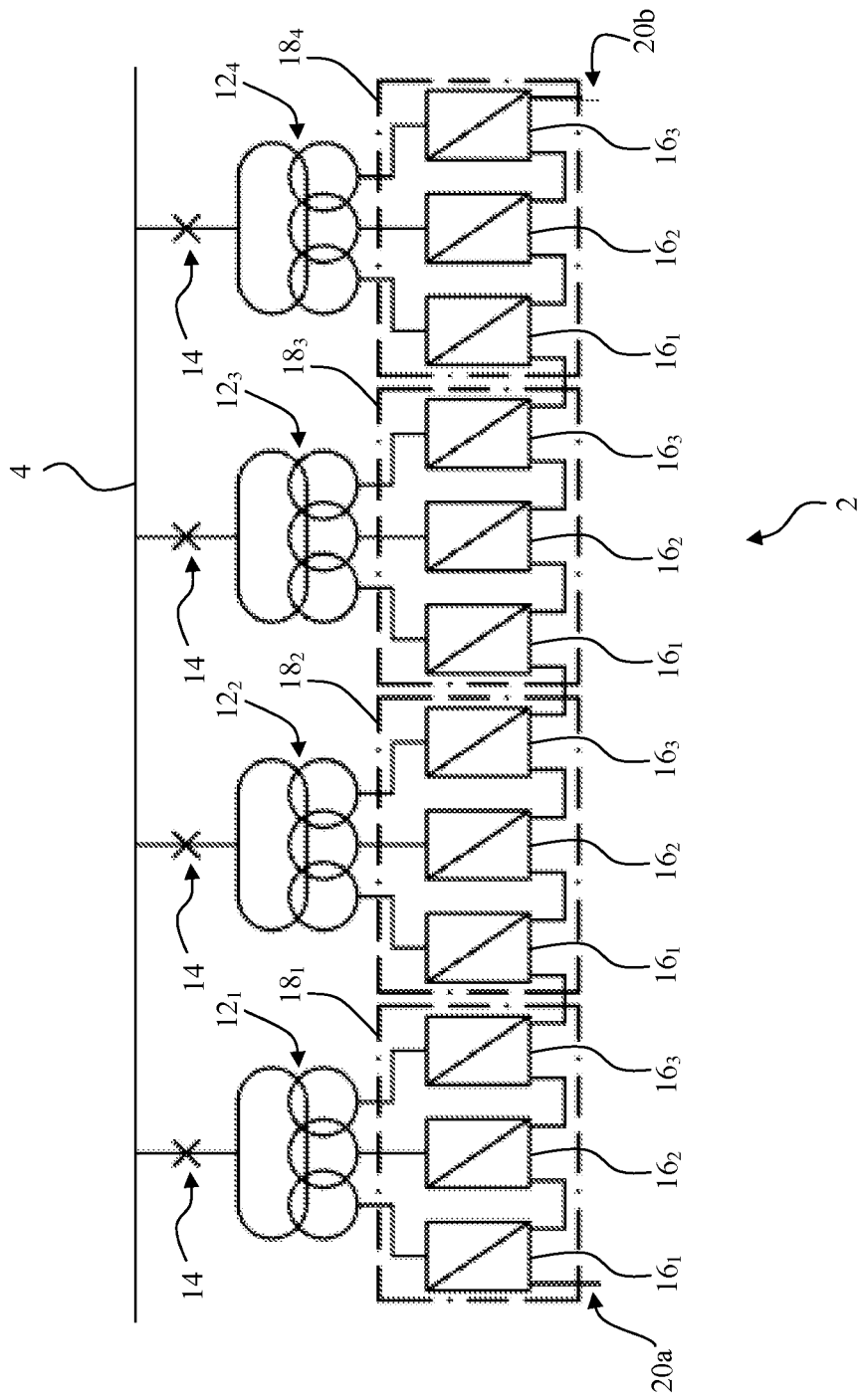
FIG. 3 shows a detail view of a converter platform of the power transmission system of FIGS. 2A and 2B.

A series of converter transformers $12_1 \ldots 12_p$ are connected to the first busbar 4 by circuit breakers 14. Each converter transformer 12 includes a primary winding that is connected to the first busbar 4 and a series of secondary windings. Each secondary winding is connected to an AC/DC converter unit 16. A converter module 18 consists of a group of AC/DC converter units 16. More particularly, the first converter platform 2 includes a series of converter modules $18_1 \ldots 18_p$ and each converter module includes a series of AC/DC converter units $16_1 \ldots 16_r$. It will be readily appreciated that in each case p and r may be any convenient number. FIG. 3 shows an arrangement with four converter transformers $12_1 \ldots 12_4$ and four converter module $18_1 \ldots 18_4$ (i.e. p=4) and where each converter module includes three converter units $16_1 \ldots 16_3$ (i.e. r=3).

Each AC/DC converter unit 16 has ac terminals that are connected to a secondary winding of the corresponding converter transformer 12.

Each AC/DC converter unit 16 also has first and second dc terminals. The AC/DC converter units 16 are connected together in series on the dc-side as shown in FIGS. 2A and 3 to define first and second dc output terminals 20a and 20b for the first converter platform 2. More particularly, it can be seen that within the first converter module 181 the first dc terminal of the first AC/DC converter unit 161 defines the first dc output terminal 20a for the first converter platform 2, the second dc terminal of the first AC/DC converter unit 161 is connected to the first dc terminal of the second AC/DC converter unit 162 (i.e. the next AC/DC converter unit in the series), the second dc terminal of the second AC/DC converter unit 162 is connected to the first dc terminal of the third AC/DC converter unit 163, and the second dc terminal of the third AC/DC converter unit 163 of the first converter module 181 is connected to the first dc terminal of the first AC/DC converter unit 161 of the second converter module 182 (i.e. the next converter module in the series). This interconnection sequence continues until the second dc terminal of the third AC/DC converter unit 163 of the fourth converter module 184 (i.e. the second dc terminal of the last AC/DC converter unit in the series of the last converter module in the series) which defines the second dc output terminal 20b for the first converter platform 2.

The second converter platform 2' is configured in the same manner with converter transformer 12'1 . . . 12'p, converter modules 18'1 . . . 18'p, and AC/DC converter units 16'1 . . . 16'r that define first and second dc output terminals 22a and 22b.

The second dc output terminal 20b of the first converter platform 2 is connected to the first dc output terminal 22a of the second converter platform 2' by a dc connection line 24 implemented as HV dc cabling.

The first dc output terminal 20a of the first converter platform 2 is connected to a first dc transmission line 26 and the second dc output terminal 22b of the second converter platform 2' is connected to a second dc transmission line 28. Both the first and second dc transmission lines can be implemented as HV dc cabling and carry a convenient dc transmission voltage.

The first busbar 4 is connected to the second busbar 4' to form the electrical 'backbone' described above. More particularly, an ac connection line 30 implemented as MV or HV ac cabling that is adapted to carry a convenient ac interlinking voltage is connected to the first busbar 4 by means of a first connector transformer 32 and circuit breakers 34 and to the second busbar 4' by means of a second connector transformer 32' and circuit breakers 34.

The first and second converter platforms 4 and 4' are located offshore and can be separated by a distance of between 5 and 15 km, for example.

The first and second dc transmission cables 26 and 28 are connected to an onshore converter station 36 shown in FIG. 2B. The converter station 36 has first and second converter halls 38 and 38' that are each configured in a similar manner to the first and second converter platforms 4 and 4'. More particularly each converter hall 38 and 38' has a series of converter transformers 401 . . . 40p or 40'1 . . . 40'p connected to a common busbar 42 by circuit breakers 44. The common busbar 42 carries a convenient ac voltage. Each converter transformer 40 includes a secondary winding that is connected to the common busbar 42 and a series of primary windings. Each primary winding is connected to a DC/AC converter unit 46 or 46'. A converter module 48 or 48' consists of a group of DC/AC converter units 46' or 46'. More particularly, each converter hall 38 and 38' includes a series of converter modules 481 . . . 48p or 48'1 . . . 48'p and each converter module includes a series of DC/AC converter units 461 . . . 46r or 46'1 . . . 46'r. For the arrangement shown in FIG. 3 then each converter hall might include four converter transformers 401 . . . 404 or 40'1 . . . 40'4 and four converter modules 481 . . . 484 or 48'1 . . . 48'4 (i.e. p=4) and each converter module might include three DC/AC converter units 461 . . . 463 or 46'1 . . . 46'3 (i.e. r=3).

Each DC/AC converter unit 46 has ac terminals that are connected to a primary winding of the corresponding converter transformer 40.

Each DC/AC converter unit 46 also has first and second dc terminals. The DC/AC converter units 46 are connected together in series on the dc-side as shown in FIG. 2B to define first and second dc input terminals 50a and 50b for the first converter hall 38 and first and second dc input terminals 52a and 52b for the second converter hall 38'.

The second dc input terminal 50b of the first converter hall 38 is connected to the first dc input terminal 52a of the second converter hall 38' by a ground connection 54. The first dc input terminal 50a of the first converter hall 38 is connected to the first dc transmission cable 26 and the second dc input terminal 52b of the second converter hall 38' is connected to the second dc transmission cable 28.

First and second grid transformers 56 and 56' are connected to the common busbar 42 by circuit breakers 58. The grid transformers 56 and 56' provide power to a utility grid or power network at a convenient ac voltage. An auxiliary grid transformer 60 can also be connected to the common busbar by circuit breakers 62 to provide an auxiliary connection.

During normal operation, power that is generated by the wind turbines 6 is provided to the busbars 4 and 4' of the first and second converter platforms 2 and 2'. The ac voltage is rectified by the connected AC/DC converter units 16 and 16' and a dc transmission voltage is transmitted to the converter station 36 by means of the first and second dc transmission cables 26 and 28. At the converter station 36 the dc transmission voltage is inverted by the DC/AC converter units 46 and 46' for onward supply to a utility grid.

Any particular converter module 18 or 18' can be isolated by means of the circuit breaker 14 that connects the associated converter transformer to the busbar.

Power can also be transferred between the first and second busbars 4 and 4' through the ac connection line 30 to provide the advantages mentioned above.

Figure 4:
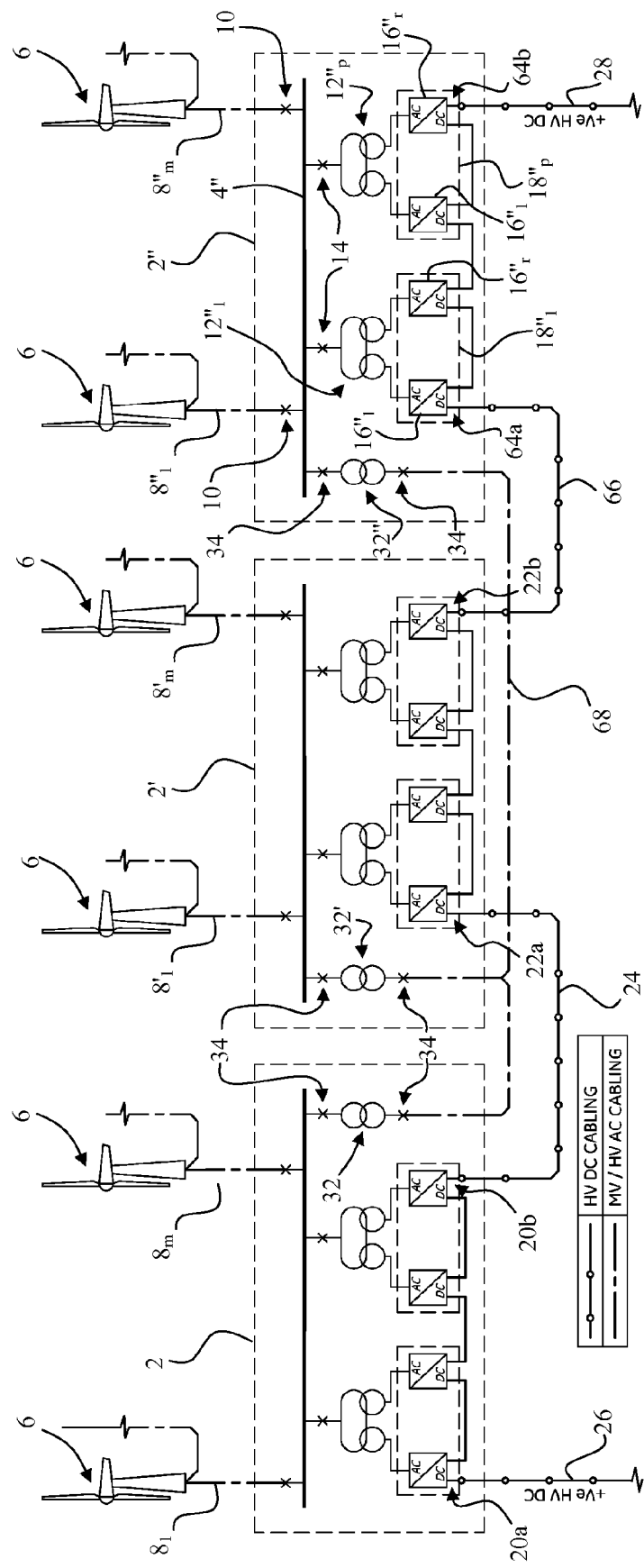
FIG. 4 is a schematic diagram showing part of a power transmission system according to the present invention with three converter platforms.

With reference to FIG. 4 part of a power transmission system according to the present invention includes a first offshore converter platform 2, a second offshore converter platform 2', and a third offshore converter platform 2" (i.e. where n=3). The power transmission system is similar to that shown in FIGS. 2A and 2B and like parts have been given the same reference numeral.

The third converter platform 2" includes a third busbar 4" carrying a convenient ac voltage.

Wind turbines 6 forming part of a wind farm are connected together in strings by medium voltage (MV) or high voltage (HV) in-field ac cabling. A series of strings 8"1 . . . 8"m are connected to the third busbar 4" by circuit breakers 10.

The third converter platform 2" is configured in the same manner as the first and second converter platforms 2 and 2' described above with converter transformer 12"1 . . . 12"p, converter modules 18"1 . . . 18"p, and AC/DC converter units 16"1 . . . 16"r that define first and second dc output terminals 64a and 64b.

The second dc output terminal 20b of the first converter platform 2 is connected to the first dc output terminal 22a of the second converter platform 2' by a first dc connection line 24 implemented as HV dc cabling. The second dc terminal 24b of the second converter platform 2' is connected to the first dc output terminal 64*a* of the third converter platform 2" by a second dc connection line 66 implemented as HV dc cabling.

The first dc output terminal 20*a* of the first converter platform 2 is connected to the first dc transmission line 26 and the second dc output terminal 64*b* of the third converter platform 2" is connected to the second dc transmission line 28. Both the first and second dc transmission lines 26, 28 can be implemented as HV dc cabling and carry a convenient dc transmission voltage.

The first busbar 4 is connected to the second and third busbars 4' and 4" to form the electrical 'backbone' described above. More particularly, an ac connection line 68 implemented as MV or HV ac cabling that is adapted to carry a convenient ac interlinking voltage is connected to the first busbar 4 by means of a first connector transformer 32 and circuit breakers 34, to the second busbar 4' by means of a second connector transformer 32' and circuit breakers 34, and to the third busbar 4" by means of a third connector transformer 32" and circuit breakers 34.

The first, second and third converter platforms 4, 4' and 4" are located offshore and adjacent converter platforms in the series can be separated by a distance of between 5 and 15 km, for example.

The first and second dc transmission cables 26 and 28 are connected to an onshore converter station (not shown) but which can be configured in a similar way to the converter station 36 shown in FIG. 2B. Other configurations of converter station are also possible for both of the arrangements of the power transmission system.

What is claimed is:

1. A power transmission system comprising:
   a series of converter platforms distributed within an area including at least a first converter platform and a last converter platform, each converter platform comprising:
      a busbar carrying an AC voltage for the converter platform and connectable to one or more devices,
      one or more converter transformers connected to the busbar, and
      one or more converter modules comprising at least a first converter module and a last converter module, each of the one or more converter modules comprising a first DC terminal, a second DC terminal, and AC terminals connected to a respective one of the one or more converter transformers, wherein if there is one converter module, said one converter module is both the first converter module and the last converter module;
   wherein (i) the first DC terminal of the first converter module of the first converter platform in the series is connected to a first DC transmission line, (ii) the second DC terminal of the last converter module of the last converter platform in the series is connected to a second DC transmission line, and (iii) except for the last converter platform in the series, the second DC terminal of the last converter module of each converter platform in the series is connected to the first DC terminal of the first converter module of the next converter platform in the series by a DC connection line.

2. The power transmission system according to claim 1, wherein each converter platform includes two or more converter transformers and two or more converter modules.

3. The power transmission system according to claim 2, wherein each converter module includes a series of one or more AC/DC converter units, wherein each AC/DC converter unit comprises a first DC terminal, a second DC terminal, and AC terminals connected to the converter transformer.

4. The power transmission system according to claim 3, wherein for each converter module, the first DC terminal of the first AC/DC converter unit in the series defines the first DC terminal of the converter module, the second DC terminal of the last AC/DC converter in the series defines the second DC terminal of the converter module, and the second DC terminal of each AC/DC converter unit except for the last AC/DC converter unit in the series is connected to the first DC terminal of the next AC/DC converter unit in the series.

5. The power transmission system according to claim 1, wherein the first DC transmission line and the second DC transmission line are connected to a converter station.

6. The power transmission system according to claim 5, wherein the converter station is an onshore converter station.

7. The power transmission system according to claim 1, wherein at least one of the converter platforms is an offshore converter platform.

8. The power transmission system according to any preceding claim, wherein the busbars are connected together by an AC connection line.

9. The power transmission system according to claim 8, wherein the AC connection line connects the busbars together in parallel.

10. The power transmission system according to claim 8, wherein the AC connection line is connected to each busbar by a connection transformer.

11. The power transmission system according to claim 1, wherein each converter transformer is connected to the busbar by a switch or circuit breaker.

12. A wind farm comprising the power transmission system according to claim 1 and a plurality of wind turbines, wherein the series of converter platforms is distributed within the wind farm and each wind turbine is connected to the busbar of a converter platform in the series.

13. A method of operating a power transmission system comprising
   distributing a series of two or more converter platforms within an area, wherein each converter platform includes:
      a busbar carrying an AC voltage for the converter platform and connectable to one or more devices,
      one or more converter transformers connected to the busbar, and
      a series of one or more converter modules, each converter module comprising AC terminals connected to a respective one of the converter transformers, a first DC terminal, and a second DC terminal, the busbars being connected together by an AC connection line; and
   transferring power through the AC connection line.

* * * * *